United States Patent [19]

Hölzl

[11] Patent Number: 5,026,998
[45] Date of Patent: Jun. 25, 1991

[54] SHAFT ALIGNMENT CHECKING METHOD

[75] Inventor: Roland Hölzl, München, Fed. Rep. of Germany

[73] Assignee: Prüftechnik Dieter Busch & Partner GmbH & Co., Ismaning, Fed. Rep. of Germany

[21] Appl. No.: 504,656

[22] Filed: Apr. 4, 1990

[30] Foreign Application Priority Data

Apr. 7, 1989 [DE] Fed. Rep. of Germany ....... 3911307

[51] Int. Cl.⁵ .............................................. G01N 21/86
[52] U.S. Cl. ....................................... 250/561; 356/152
[58] Field of Search ............... 250/561, 571; 356/141, 356/152

[56] References Cited

U.S. PATENT DOCUMENTS

| | | | |
|---|---|---|---|
| 4,741,618 | 5/1988 | Loy | 356/152 |
| 4,774,405 | 9/1988 | Malin | 356/152 |
| 4,847,511 | 7/1989 | Takada et al. | 250/561 |
| 4,864,148 | 9/1989 | Lysen et al. | 250/561 |

Primary Examiner—David C. Nelms
Assistant Examiner—Khaled Shami
Attorney, Agent, or Firm—Robert W. Fiddler

[57] ABSTRACT

A method for checking the coaxial alignment of tandem-arranged shafts involving the detection of a coaxial in-line or an offset state of the said shafts. In different angular positions of measurement two independent signals are produced related to any parallel offset and any angular offset of the shafts respectively. In the known methods the angular positions of measurement are bound by a mutual angular spacing of 90°. This leads to problems if there are obstructions in these angular positions of measurement of the device used for measuring. The method in accordance with the invention makes possible alignment checking operations using freely selectable angular positions of measurement.

11 Claims, 4 Drawing Sheets

• Points of measurement according to the invention
○ Points of measurement according to the state of art

SHAFT ALIGNMENT CHECKING METHOD

BACKGROUND OF THE INVENTION

The invention relates to a method for checking tandem-arranged shafts to detect angular and/or parallel offset between the center axes of the shafts, using at least one pair of elements made up of an indicating pointer which is fixed in relation to one of the shafts and is generally parallel to its center axis and of a reference element fixedly attached to the other shaft, in a plurality of angular positions of measurement of the shafts, which correspond to each other from shaft to shaft, for the production of two mutually independent alignment data signals, which respectively correspond, in a manner related to the respective angular position of measurement, to a component of the minimum distance apart of the center axes of the shafts, i.e. the parallel offset, and to a component of the maximum angle between such center axes if crossing each other, i.e. the angular offset, or from which such components may be derived.

In known methods of this type (see the periodical INSTANDHALTUNG, December 1982, published by Verlag Moderne Industrie, Landsberg, Germany, "Die Kunst des Ausrichtens übernimmt jetzt der Computer" and European patent publication, EP-B1-0 145 745) the alignment data signals are produced at angular positions of measurement, which are angularly spaced from each other by about 90° and values for parallel offset and angular offset are obtained directly from these data. A useful degree of accuracy is obtained, but the known methods are only free of problems or are only able to be used at all, if there is a suitable clearance for the measuring device and the indicating pointer around the shafts. The measuring device, which produces the alignment data signals, necessarily laterally projects from the shafts and furthermore each indicating pointer is necessarily located outside and to the side of the shaft. The measurements are taken in at least three positions of measurement so that the shafts with the measuring device have to be turned through at least 180°. At the positions at which the measuring device is located on the shafts it is necessary for there to be a clearance over this substantial angle around the shafts, and furthermore at least in the angular positions of measurement (which are set in relation to each other) along the length of each indicating pointer there is to be no obstruction between the parts of the measuring device arranged on the two shafts, this also applying if the indicating pointer is in the form of a light beam (see said publication EP-B1- 0 145 745). This condition is frequently not fulfilled in practice and may in fact not be able to be fulfilled.

SHORT SUMMARY OF THE INVENTION

One object of the present invention is to so improve a method of measurement of the type initially specified that it may be performed with a substantially smaller angular range for the angular positions of measurement and/or without previous determination of the latter in relation to each other so that it may be used with the measuring device projecting from the shafts and with an indicating pointer projecting clear of the shafts in a manner assuring a substantially greater degree of adaptation in accordance with the space around the shafts than is the case with said known methods.

A still further object of the invention is to devise such an improved method which assures a degree of accuracy which is at least equal to that of known methods.

In order to meet these or other objects appearing in the present specification, claims and drawings, in the invention:

(a) the shafts are turned into at least five different and freely selected angular positions of measurement, in which measurements are taken, (b) the signals produced on taking such measurements are treated as vectors with the same origin or, respectively, pairs of values in a plane coordinate system, (c) using a computer a process of calculation is performed on the basis of points of measurement given by the ends of the vectors or, respectively, the pairs of values to obtain the characteristic data of the curve which would be produced by a rotation of the shafts through 360°, such process taking into account the fact that for geometrical reasons the points of measurement are practically only able to orginate from a curve corresponding to an ellipse but are subject to mensuration uncertainties, and such process using an optimizing method, such as more especially the least mean square method.

(d) the angular position in space of at least one of these angular positions of measurement is ascertained and, (e) using a computer the position in space of the shafts in relation to each other and if need be, correction values for the positional correction thereof in order to eliminate any alignment error detected are ascertained on the basis of the characteristic data of the curve taking into account the ascertained angular positions in space and the known direction of rotation of the shafts on turning into the angular positions of measurement.

In the method in accordance with the invention it is possible for the at least five different angular positions, in which measurements are taken, to be freely selected. Accordingly they may be selected to make best use of the amount of space available around the shafts for the respective positioning of the measuring device and the indicating pointers. It is neither necessary to keep to a predetermined angular distance between the positions of measurement nor is it necessary for the measurement to be extended over a large angular range so that obstructions may be weighted to compensate therefor just as desired. In order to produce precise results it is sufficient to have only a relatively small angular range for the positions of measurement. Accordingly the method in accordance with the invention is suitable for shafts which have many obstructions around them and are inaccessible.

Further developments of the invention are described in the claims.

A detailed description of the invention will now follow with reference to the drawings.

LIST OF THE SEVERAL VIEWS OF THE DRAWINGS.

FIG. 1 to FIG. 7 respectively diagrammatically show side elevations of devices, which in part are known, for the production of signals representing measurements. FIG. 8 shows a coordinate system.

DETAILED DESCRIPTION OF THE EMBODIMENTS OF THE INVENTION

Figure 8:
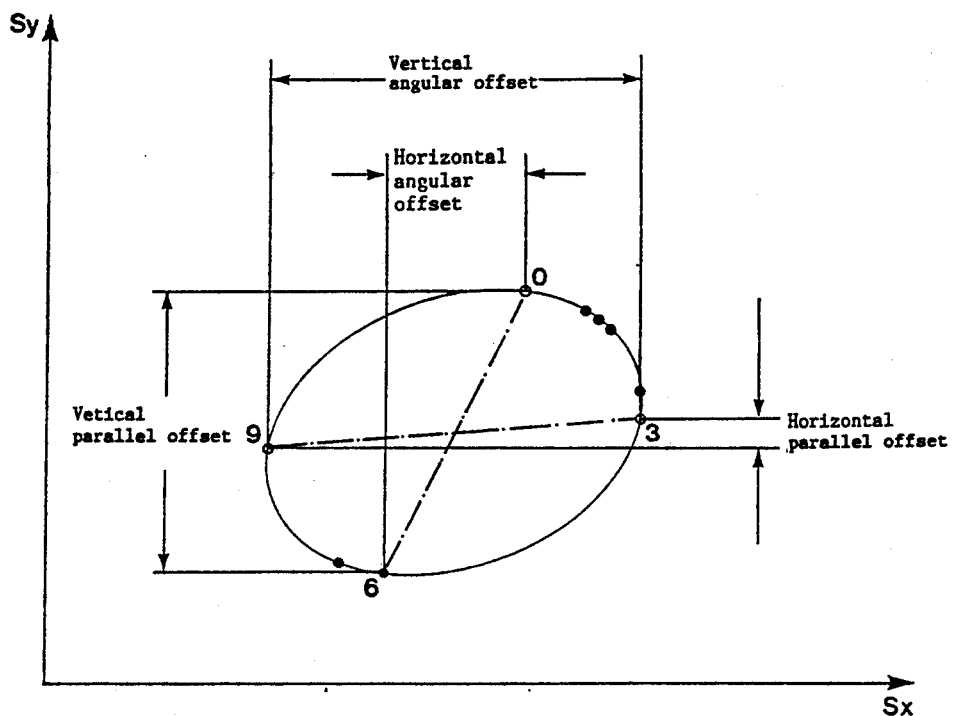

In the devices shown in FIGS. 1 through 7 the signals produced when measurements are taken are processed and treated in accordance with the method of the invention in order to ascertain the relative position in space of the shafts in relation to each other and if appropriate to produce correction values for the correction of the position thereof in order to overcome any error in alignment that may have been found. The plane rectangular coordinate system of FIG. 8 shows the position of the points of measurement taken in accordance with the invention and the substantially elliptical curve calculated therefrom together with the position of the points of measurement taken in accordance with the known methods dispensing with knowledge of this curve.

In all the figures of the drawings the two shafts whose alignment is to be tested are denoted by 1 and, respectively, 2.

In all the devices shown in the drawings for the production of signals representing measurements, the signals are supplied to a computer 4, possibly via a data converter 3, and in the computer the signals produced by the various devices in at least five positions of measurement, of the shafts are processed in the manner indicated below using a control program. This method of processing is as follows:

The said signals are treated as vectors with a common origin or as pairs of values in one plane, Starting with the points of measurement given by the ends of the vectors or, respectively, the pairs of values, in the plane and having regard to the fact that for geometrical reasons these points practically may only originate from a curve generally corresponding to an ellipse and which would result from rotation of the shaft through 360° and continuous detection of the signals, the characteristic data of the curve are calculated. Having regard to the fact that these points of measurement are subject to uncertainties of mensuration, which have their origin in the unavoidable inaccuracies in measurement when producing the signals, in the calculation an optimizing method, as for instance the least mean square method, is employed. The accuracy of computation of the characteristic data of the curve increases with an increase in the number of positions of measurement and with an increase in the angular range for the positions of measurement, but however even with five positions of measurement over a comparatively small angular range it is possible to produce characteristic data of the curve which are sufficiently accurate in practice. The curve may also be produced in the special forms of an ellipse, as for instance a circle or, respectively, a point (circle with zero radius).

The angular position in space of at least one angular position of measurement is ascertained by a suitable device on the shafts, more especially as a reference position.

On the basis of the characteristic data of the curve and taking into account the reference position and the known direction of rotation—which is for instance stipulated for the user or is ascertained by a suitable device—in which the shafts are moved into the individual angular positions of measurement, on the one hand the position in space of the shafts in relation to each other and on the other hand, on the basis of such position the correction values, if any, for dealing with any alignment error detected, are ascertained.

The devices now to be described differ from each other in the manner in which the signals used for measurement are produced. The further processing of the signals produced is then always carried out according to the method described above.

Figure 1:
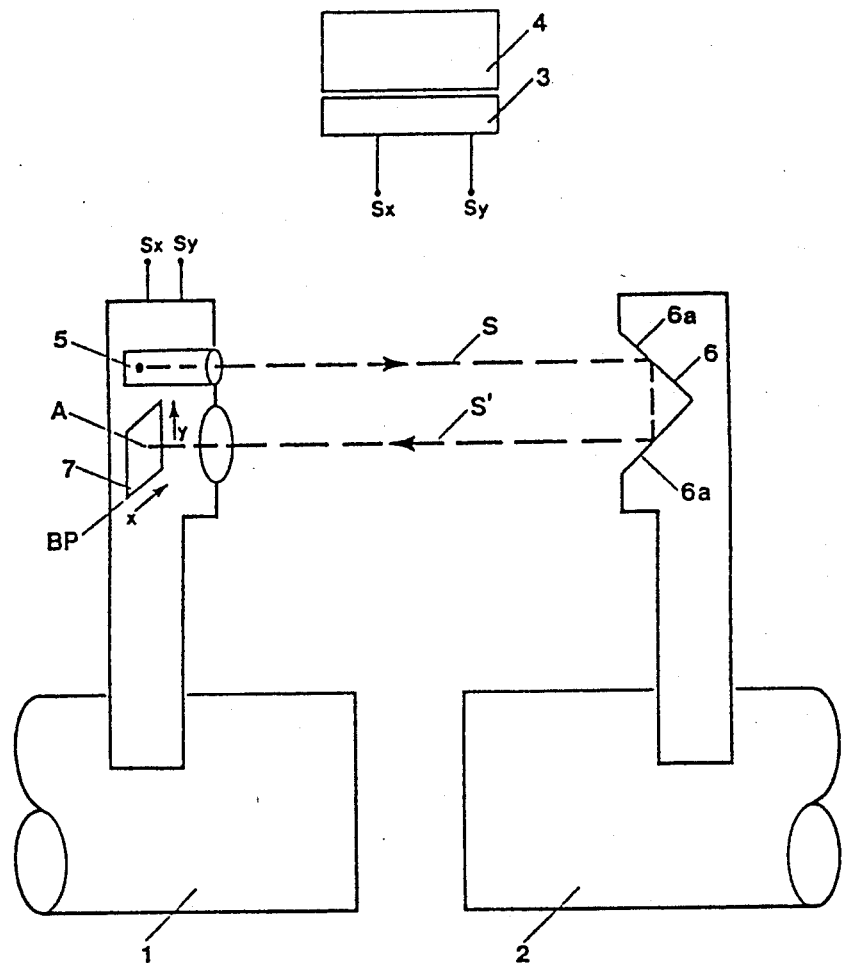

In the measuring device shown in FIG. 1 diagrammatically the signals representative of measured values are produced in every angular position of measurement as signals, of which the one corresponds to the radial component of the distance of the shaft axes in a plane substantially perpendicular to the latter at the point of measurement of the reference element and the other one corresponds to that component of the angle between the shaft axes which extends normally to this radial direction. For this purpose from the shaft 1 a light beam S (preferably in the form of a laser beam) is directed parallel to the shaft center axis from a light source 5 towards a right angle mirror prism 6, which is arranged as a reference element on the second shaft 2 in such a manner that its mirror surfaces 6a subtending the angle of 90° extend substantially normally to a radial plane (in the present case the plane of the drawing) of the second shaft 2. The first shaft 1 bears a measuring receiver 7, fixed in relation to the light source 5, in the form of a biaxial electro-optic position detector which is so secured to the first shaft 1 that the light beam S' reflected by the lower mirror face 6a is incident thereon. Thus in every position of measurement of the two shafts 1 and 2 the position detector 7 produces two signals $S_x$ and $S_y$, which correspond to the coordinates x and y of the point A of incidence of the light beam on the position detector 7 with respect to a reference point BP fixed in relation to the shaft, and being selectable somewhere in the measuring plane (which is substantially perpendicular to the center axis of the shaft 1) of the position detector.

The structural features of the device may be as described in the said publication EP-B1- 0 145 745.

Figure 2:
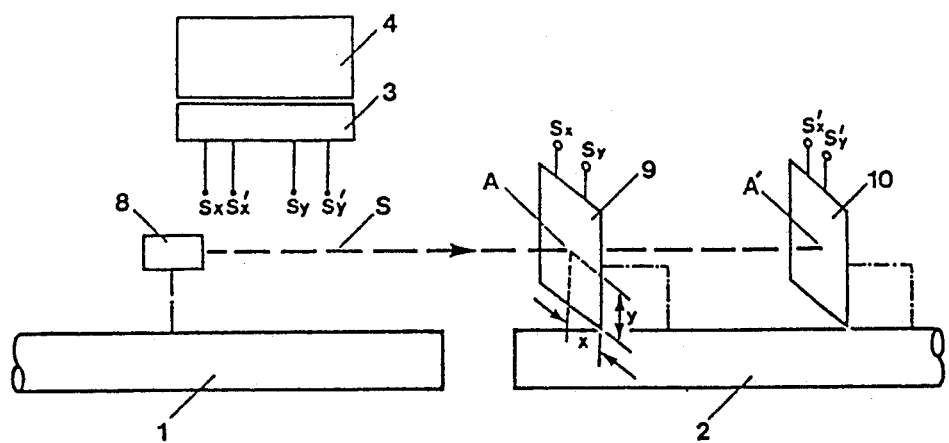
Figure 3:
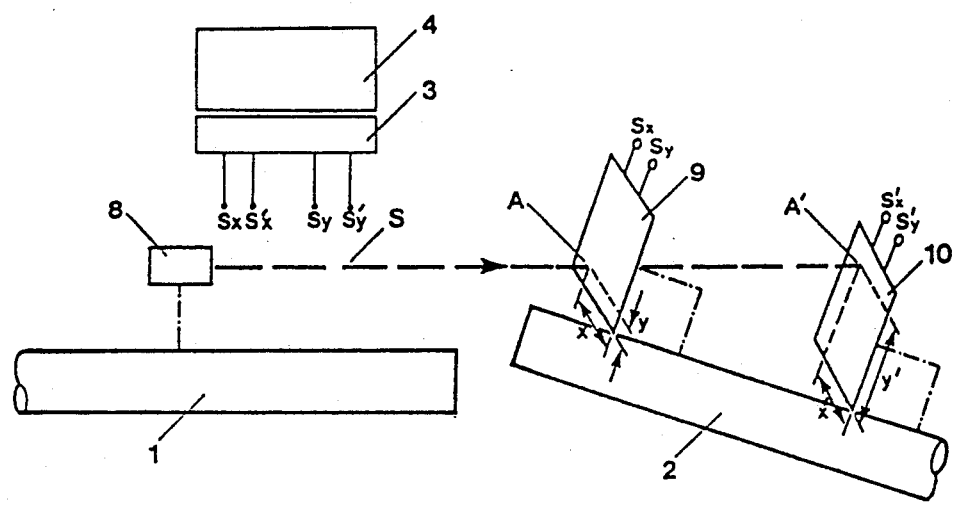

In the device as in FIGS. 2 and 3 the signals are produced in each angular position of measurement in two pairs as signals $S_x$ and $S_y$ and $S'_x$ and $S'_y$, which are proportional to the radial components, set by the respective angular positions of measurement, of the distances which the center axes of the shafts 1 and 2 comprise in two planes, which are substantially perpendicular to the shaft 2 and are located in the range of the latter at a certain predetermined distance. For this purpose in the case of the device as shown in FIGS. 2 and 3 in the individual angular positions of measurement of the shafts 1 and 2 a light beam S (preferably in the form of a laser beam) is directed from the light source 8 substantially parallel to the center axis of such shafts 1 and 2 towards two biaxial opto-electronic position detectors 9 and 10, which are associated with the light beam S on the other shaft 2 at two points of measurement (located in the direction of projection of the light beam S at a distance one behing the other) which respectively supply electrical signals $S_x$, $S_y$ and $S'_y$, which correspond to the size and the prefix sign of mutually perpendicular components x, y and x', y' of the distance of the respective point of incidence A and, respectively, A' of the light beam S in the plane of the detector 9 and, respectively, 10 from a selected reference point BP in the latter. The light source 8 and the position detectors 9 and 10 are rigidly connected with the shaft 1 and, respectively, 2, this being indicated in FIGS. 2 and 3 by the broken lines.

FIGS. 2 and 3 show the shafts 2 in various positions of alignment in order to make clear the different position of the points A and A' of incidence on the detector planes.

Figure 4:
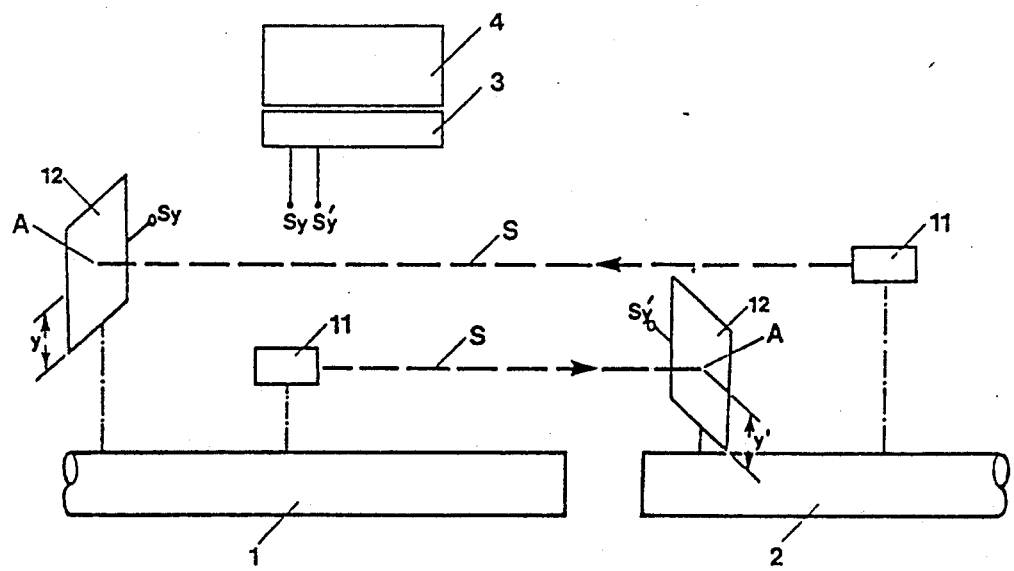
Figure 5:
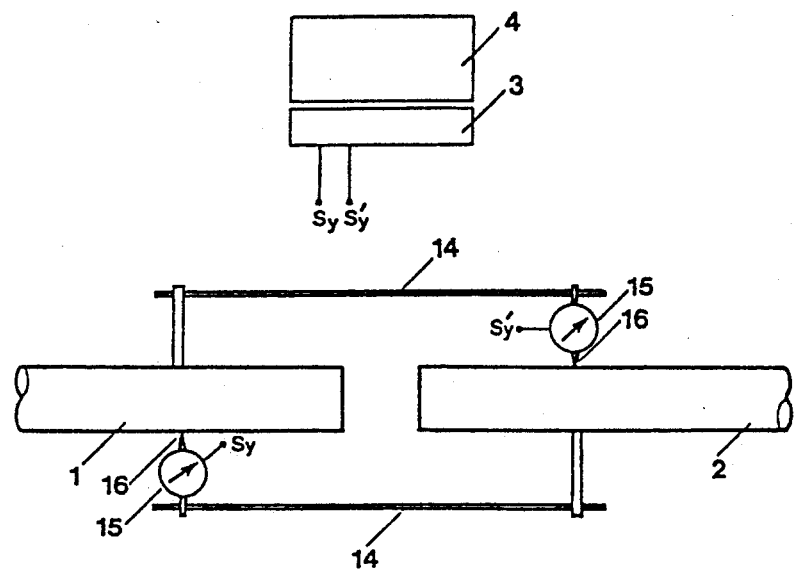

In the devices shown in FIGS. 4 and 5 the signals used in the measuring operation are produced in the individual angular positions of measurement for each shaft separately as the signals $S_z$ and, respectively, $S'_y$, which are proportional to the distance components of the center axes of the shafts 1 and 2 in a plane fixed in relation to the respective shaft 1 or 2 and substantially perpendicular thereto, in the radial direction as set in space by the selected angular position of measurement.

For the said purpose in the case of the device of FIG. 4 a light beam S, preferably in the form of a laser beam, is directed from each of the two shafts as an indicating pointer, from a light source 11 to the respective other shaft 1 and, respectively, 2, so that such beam extends in the region of an associated reference element 12 in the form of an opto-electronic detector, (which may be biaxial if required) on this other shaft 1 or, respectively, 2, so that such detector supplies a signal $S_y$ and, respectively, $S'_y$, which corresponds to the component y and, respectively, y' of the distance of the center axis from the reference point BP in a plane (which is generally normal to the center axis of this other shaft) of the position detector, in a direction which is radial with reference to the shaft.

The device in accordance with FIG. 5 does not differ in function from the previously described one, but it does differ in its structure since in its case the indicating pointers are in the form of rigid rods 14, which are rigidly secured on one of the shafts 1 and 2 and at the other free end thereof each carry a dial gage 15.

The measuring dial gages 15 have feelers 16 engaging the periphery of the shaft so that the dial gages provide signals $S_y$ and, respectively, $S_y'$, which are respectively proportional to the distance components between the center axes of the shafts 1 and 2 in a plane (substantially normal to one of the shafts and fixedly associated therewith) in the radial direction as set in space by the selected angular position of measurement.

Figure 6:
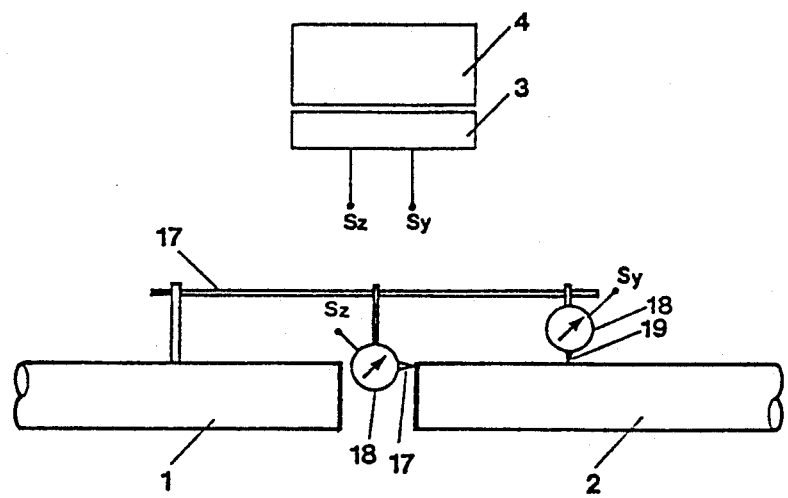

In the device of FIG. 6 the signals are produced in each angular position of measurement in the form of two signals, of which the one ($S_y$) corresponds to the component of the distance between the center axes of the shafts 1 and 2 in the plane of measurement in the radial direction, as set by the respective angular position of measurement, and the other signal ($S_z$) corresponds to the component of the angle between the center axes of the shafts 1 and 2 in this radial direction.

For the above-mentioned purpose the indicating pointer is in the form of a rigid rod 10 secured to the shaft 1 and which carries two dial gages 18, of which one has a feeler 19, which is radial in relation to the shaft 2, and engages the periphery of the same, and of which the other has an axially directed feeler 17 engaging the end face (which is essentially perpendicular to the center axis of the shaft 2) near the edge of such face.

The readings taken by the dial gages 18 are converted into suitable electrical signals $S_y$ and $S_y'$, and provide the same information as the signals produced in the devices described so far, if they are processed according to the method of the invention using the computer 4.

The device in accordance with FIG. 6 may also be designed with opto-electronic components of the type described above.

Figure 7:
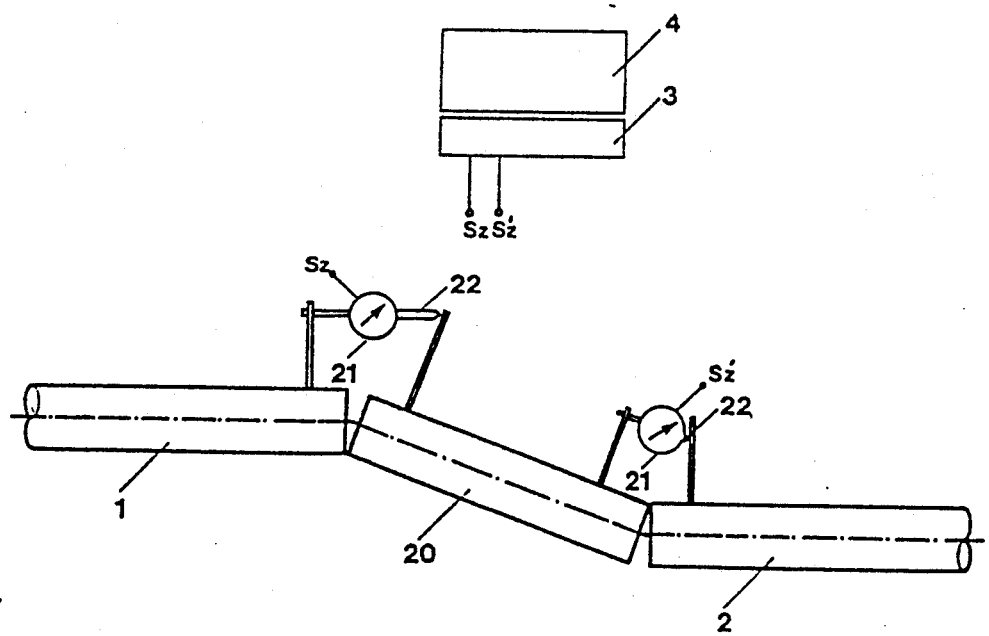

In the embodiment shown in FIG. 7 the two shafts 1 and 2, whose alignment is to be tested, are connected with each other by an intermediate shaft 20. The device for testing the alignment in this case consists of two dial gages 21, which are rigidly secured to the shaft 1 and, respectively, to the shaft 20. The feelers 22 of the dial gages 21 are shiftable in a direction essentially parallel to the center axis of the shaft, to which the dial gage is secured. They are so placed that their free ends engage a surface 23 which is normal to the center axis of the adjacent shaft and is fixed in relation thereto. The dial gages 21 are so secured to their shafts that they are always located in the same plane of measurement. In the case of this arrangement the dial gages respectively measure the angle between the center axes of the shafts 1 and 20 and, respectively, the shafts 20 and 2 and they supply corresponding electrical signals S2 and S2' to the computer 4.

FIG. 8 shows a plane rectangular coordinate system on which five points ascertained by the method of the invention have been plotted in the form of black dots. The position of the individual points is defined by the magnitude, plotted along the X and Y axes, of the signals $S_x$ and $S_y$ produced e.g. by the device of FIG. 1 using the method of the invention in arbitrary positions of measurement, which are more especially selected taking the aspect of accessibility into account.

The general definition of a quadratic curve is as follows:

$$F = a^2 + 2bxy + cy^2 + 2dx + 2ey + f = 0$$

The invention is based on the recognition that all points produced in individual positions of measurement for geometrical reasons may only stem from a common curve, which essentially corresponds to an ellipse, and that such points are subject to uncertainty of measurement so that the above equation will yield the optimally approximated and essentially elliptical curve using an optimizing method, more particularly the least mean square method.

The points were also plotted as small circles which in accordance with the known methods were directly obtained in the space-related positions of measurement at 12 o'clock, 6 o'clock and 9 o'clock without taking into account knowledge of the curve, something that assumes accessibility of these positions of measurement. From the position of these points of measurement 0, 3, 6 and 9 it is possible to derive, as indicated in FIG. 8, the horizontal and the vertical parallel and angular offset of the shafts 1 and 2 in relation to each other. In accordance with the method of the invention it is possible to ascertain these offsets by computation, if in respect to at least one of the black points of measurement to be seen in FIG. 8 the position in space of the associated position of measurement is also found.

For the purpose of clarity in the drawing the shafts are shown in part with a considerable exaggeration of the misalignment. In practice the amount of offset is of the order of a few tenths of a millimeter for parallel offset and in the case of angular offset the amount will be less than 1°.

When working with the apparatus as shown in FIGS. 1 through 7 it may occur that the measuring range of the apparatus would be exceeded here and there, that is to say for a certain angular extent within the range of 360° around the shafts 1 and 2. In this case the method of the invention makes it possible to work solely with angular positions of measurement, in which this is not the case.

It is clear that with the apparatus in accordance with FIGS. 1 through 5 a very large number of closely packed values or readings may be handled as represented by suitable signals. The handling of a large number of such values offers the further advantage that "stray" values, which come into existence in some way or other, do not have any substantial influence on the result of measurement as a whole.

I claim:

1. A method for checking tandem-arranged shafts to detect angular and/or parallel offset between the center axes of the shafts using at least one pair elements made up of an indicating pointer which is fixed in relation to one of the shafts and is generally parallel to its center axis and of a reference element fixedly attached to the other shaft, in a plurality of angular positions of measurement of the shafts, which correspond to each other from shaft to shaft, for the production of two mutually independent alignment data signals, which respectively correspond, in a manner related to the respective angular position of measurement, to a component of the minimum distance apart of the center axes of the shafts, i.e. the parallel offset, and to a component of the maximum angle between such center axes, i.e. the angular offset, or from which such components may be derived, characterized in that (a) the shafts are turned into at least five different and freely selected angular positions of measurement, in which measurements are taken, (b) the signals produced on taking such measurements are treated as vectors with the same origin or, respectively, pairs of values in a plane coordinate system, (c) using a computer a process of calculation is performed on the basis of points of measurement given by the ends of the vectors or, respectively, the pairs of values to obtain the characteristic data of the curve which would be produced by a rotation of the shafts through 360°, such process taking into account the fact that for geometrical reasons the points of measurement are practically only able to originate from a curve corresponding to an ellipse but are subject to mensuration uncertainties, and such process using an optimizing method, (d) the angular position in space of at least one of these angular positions of measurement is ascertained and, (e) using a computer to ascertain the position in space of the shafts in relation to each other and obtain correction values for the positional correction thereof in order to eliminate any alignment error detected on the basis of the characteristic data of the curve taking into account the ascertained angular positions in space and the known direction of rotation of the shafts on turning into the angular positions of measurement.

2. The method as claimed in claim 1 wherein the said signals are produced in each angular position of measurement as signals, of which the one corresponds to the distance apart which the axes of the shafts comprise in the plane extending substantially perpendicularly thereto, at the measuring position of the reference element i.e. the plane of measurement, in the respective radial direction set by the angular position of measurement and of which the other corresponds to the component, which is perpendicular to this radial direction, of the angle between the shaft axes.

3. The method as claimed in claim 2, comprising the following steps for the production of said signals:

(a) a light beam, in the form of a low-divergence light ray, is directed from a first one of said shafts so as to be generally parallel to the center axis of said shaft, towards a right angle mirror prism or an equivalent optical system, which is so mounted on a second one of the said shafts that mirror surfaces thereof including the angle of 90° between them extend in a direction substantially perpendicular to a radial plane of the second shaft, (b) a measuring receiver is so permanently secured to the first said shaft that the light beam reflected from the other mirror surface of the mirror arrangement falls on it, and (c) by means of the said receiver two signals are produced in each said position of measurement, such signals corresponding to the coordinates of the point of incidence of the light beam on the said receiver from a reference point fixed with respect to the shaft in a plane of measurement which is substantially perpendicular to the center axis of the first shaft (FIG. 1).

4. The method as claimed in claim 1, wherein the said signals are produced at the individual angular positions of measurement as signals, which are proportional to the radial components, as set by the respective angular positions of measurement, of the distances apart of the center axes of the shafts in two planes, which are substantially perpendicular to the two shafts as planes of measurement and in relation to one of the said shafts are at a predetermined mutual distance apart.

5. The method as claimed in claim 4, wherein for the production of the said signals in the individual positions of measurement a light beam in the form of a low-divergence ray is directed from a light source in a direction along a first one of said shafts parallel to a center axis thereof, towards two opto-electronic position detectors, which are related to the light beam on the second one of said two shafts in two planes of measurement which are located at least virtually in the direction of projection of the light beam in sequence and are substantially perpendicular to this second shaft to supply electrical signals, which correspond to the radial component, as set by the said angular position of measurement of the distance apart between the point of incidence of the light beam in the plane of measurement of the respective detector and a reference point in the plane (FIGS. 2 and 3).

6. The method as claimed in claim 1, wherein the said signals are produced in the individual angular positions of measurement separately for each shaft as signals, which are proportional to the distance components apart of the center axes of the two shafts in a plane fixedly associated with one of the respective shafts and constituting a plane of measurement perpendicular to said shafts, and in the radial direction as set by the angular position of measurement.

7. The method as claimed in claim 6, wherein for the production of the said signals in the individual positions of measurement an indicating pointer is directed from each of the two shafts towards the respective other shaft, with such pointer extending respectively to a position adjacent to one associated reference element which is located on the said other respective shaft and supplies a signal corresponding to the radial distance of the center axis of the said pointer from a reference point in a plane of measurement, which is generally perpendicular to the center axis of this other plane, of the reference element (FIGS. 4 and 5).

8. The method as claimed in claim 7, wherein the said indicating pointers are constituted by beams of an electromagnetic radiation of low divergence, and the reference elements are constituted by opto-electronic position detectors (FIG. 4).

9. The method as claimed in claim 7, wherein said indicating pointers are rigid rods and each reference element includes a measuring dial gage having a feeler able to be moved by the pointer in the form of a rod radially in relation to the said shaft (FIG. 5).

10. The method as claimed in claim 1, wherein the said signals are produced in each angular position of measurement as signals, of which one corresponds to the distance apart which the axes of the shafts comprise in the plane of measurement extending substantially perpendicular to the axes at the position of measurement of the reference element, in the radial direction as set by the respective angular position of measurement and of which the other signal corresponds to the component of the angle between the axes of the shafts in this direction (FIG. 6).

11. The method according to claim 1 for shafts whose alignment condition is to be tested and which are interconnected by an intermediate shaft, wherein the said signals are produced in each angular position of measurement as signals, of which one corresponds to the angle between the center axis of the one shaft and the center axis of the intermediate shaft in a plane extending in the radial direction set by the respective angular position of the measurement, and of which the other one corresponds to the angle between the center axis of the other shaft and the center axis of the intermediate shaft in the said plane (FIG. 7).

* * * * *